(No Model.)
H. B. CARLTON.
PHOTOGRAPHIC CAMERA.
No. 564,472. Patented July 21, 1896.
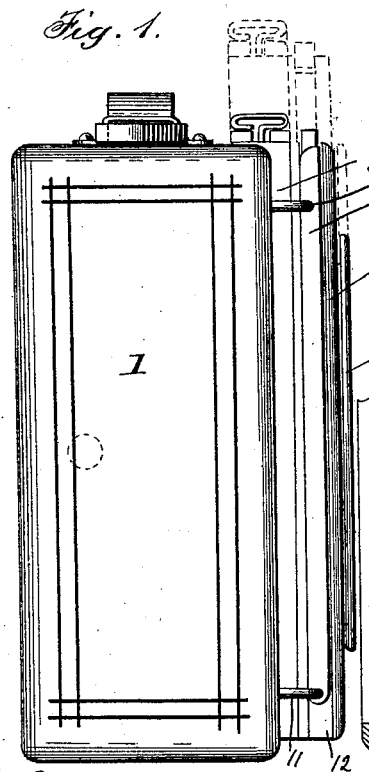
Fig. 1.
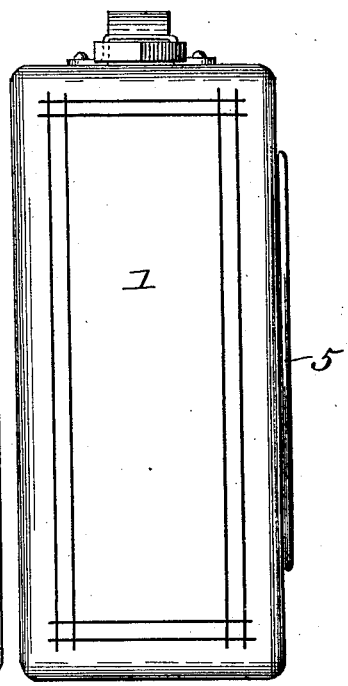
Fig. 2.
Fig. 5.
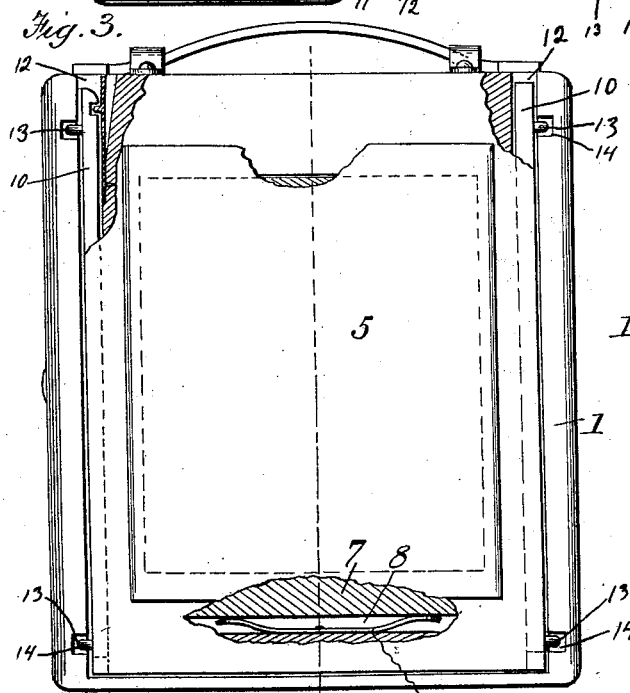
Fig. 3.
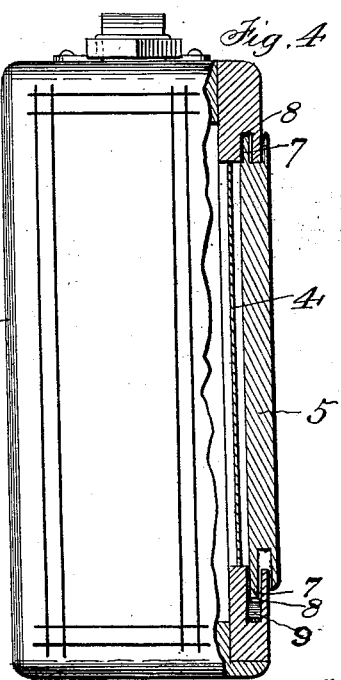
Fig. 4.
Witnesses:
Franck L. Ourand
Albert Popkins
Inventor:
Harvey B. Carlton.
by Benj. R. Catlin Attorney.
THE NORRIS PETERS CO., PHOTO-LITHO., WASHINGTON, D. C.

UNITED STATES PATENT OFFICE.

HARVEY B. CARLTON, OF ROCHESTER, NEW YORK.

PHOTOGRAPHIC CAMERA.

SPECIFICATION forming part of Letters Patent No. 564,472, dated July 21, 1896.

Application filed January 29, 1896. Serial No. 577,271. (No model.)

*To all whom it may concern:*

Be it known that I, HARVEY B. CARLTON, a resident of Rochester, in the county of Monroe and State of New York, have invented certain new and useful Improvements in Cameras; and I do hereby declare the following to be a full, clear, and exact description of the invention, such as will enable others skilled in the art to which it pertains to make and use the same.

The invention relates to cameras, and has for its object to provide a convenient and compact camera for the use of bicyclists and others; and it consists in the construction hereinafter described and particularly pointed out.

In the accompanying drawings, Figure 1 is a side elevation of a camera, the back, plate-holder, and ground-glass cover being indicated in dotted lines as partially removed. Fig. 2 is a side elevation with the plate-holder removed. Fig. 3 is a rear elevation, partly in section, the plate-holder being omitted. Fig. 4 is a side elevation of the same, partly in section. Fig. 5 is a partial section on line 5 5 of Fig. 3, the back plate being omitted.

Numeral 1 denotes a camera-box and 2 a removable back, and 3 a removable plate-holder. These parts being of well-known form need not be particularly described. The back holds a ground glass 4 and constitutes a frame therefor, and 5 denotes a removable panel to cover and protect the glass. The panel is preferably larger than the exterior of the opening in the holder and at each end has an inner edge or flange 7, adapted to enter a groove 8 in the back.

9 is a spring situated in one of said grooves 8, which spring can be compressed by pushing an edge or flange 7 into groove 8 in applying the panel to the back.

The present improvement relates more particularly to so-called "hand" or "detective" cameras, in which compactness is highly desirable and an inclosing case objectionable. Further, it is in many cases desirable that the exterior of such a camera comprise nothing to clearly disclose its nature and purpose. These objects are attained by the present improvement. The ground glass is framed in the detachable back of the box and is protected by a removable cover or panel, preferably of the same general appearance as the body of the box. This cover is within or closely contiguous to the back, and entirely excludes light and also dust. When the camera is to be used, the panel is readily removed and the glass is then unobstructed.

If desirable in any case, the plate-holder can be removed and separately carried, as, for example, in the pocket of a wheelman. In such case the back being in place and the article closed there are no visible indications of its nature or use.

The improvement is not limited to the particular means for holding the panel or cover removably in place.

10 indicates movable bars one at each end of the camera for holding the plate-holder and the back, and 11 indicates spring-held yokes or bails the ends of which are fixed to said bars. The latter are situated in grooves 12 in the parallel side edges of the back, and the arms 13 of the yokes 11 are situated in grooves 14, formed in the interior of the side walls of the camera at right angles and adjacent to grooves 12.

15 denotes a spring to hold the back, or back and plate-holder, to the camera. The bars 10 are shown in their outermost situation, as when the plate-holder is inserted beneath them in Fig. 1, the springs 13 being then under the greatest tension.

In Fig. 5 both the plate-holder and back are wanting and the springs are represented accordingly, the bar being shown as held in its innermost situation in readiness to receive under it either the plate-holder or the back, or both.

Heretofore a hood provided with tubular eye-sockets has been attached to the box at the rear, and such construction is not of my invention, which is characterized by the features of construction and the effects above described and hereinafter particularly pointed out.

Having thus fully described my invention, what I claim is—

1. In a camera the combination of the removable back having an opening for a screen, springs to hold said back to the camera in a yielding manner to permit the insertion between it and the camera of a removable plate-holder, a screen closing the opening in the back and framed therein, and a removable cover for said screen also fitted in the back, said springs being adapted to hold the back closed either against the camera-box or against the plate-holder according as the latter is or is not in place in the box, all substantially as described.

2. In a camera, the removable back having an opening for a screen, springs to hold said back in the camera in a yielding manner to permit the insertion and removal of a plate-holder, a ground-glass screen framed in the back and situated in said opening, a cover closely adjacent the screen larger than said opening and entirely closing and concealing the same and provided with flanges and grooves on its opposite ends, said flanges being adapted to enter grooves in the back at the ends of the spring and the cover-grooves being adapted to receive the edges of the back, substantially as described.

3. In a camera the combination of the removable back having grooves in its edges, bars situated in said grooves, the back being adapted thereby to slide on and off the bars, springs attached to the bars and to the camera, a ground-glass screen formed in the back, and a removable cover for said screen, all substantially as described.

4. In a camera, the removable back, springs to hold said back in the camera in a yielding manner to permit the insertion and removal of a plate-holder, a ground-glass screen framed in the back adjacent an opening therein, a cover larger than said opening and entirely closing and concealing the same and provided with flanges and grooves on its opposite ends, said flanges being adapted to enter grooves in the back at the end of the spring and the cover-grooves being adapted to receive the edges of the back, substantially as described.

In testimony whereof I have signed this specification in the presence of two subscribing witnesses.

HARVEY B. CARLTON.

Witnesses:
JOSEPH GODDARD,
GEO. CARLTON.